United States Patent
Bruck

(10) Patent No.: US 11,712,761 B2
(45) Date of Patent: Aug. 1, 2023

(54) METHODS AND APPARATUS OF WELDING USING ELECTRODES WITH COAXIAL POWDER FEED

(71) Applicant: Siemens Energy, Inc., Orlando, FL (US)

(72) Inventor: Gerald J. Bruck, Myrtle Beach, SC (US)

(73) Assignee: SIEMENS ENERGY, INC., Orlando, FL (US)

( * ) Notice: Subject to any disclaimer, the term of this patent is extended or adjusted under 35 U.S.C. 154(b) by 382 days.

(21) Appl. No.: 16/613,311

(22) PCT Filed: Jun. 27, 2017

(86) PCT No.: PCT/US2017/039471
§ 371 (c)(1),
(2) Date: Nov. 13, 2019

(87) PCT Pub. No.: WO2019/005011
PCT Pub. Date: Jan. 3, 2019

(65) Prior Publication Data
US 2020/0198064 A1 Jun. 25, 2020

(51) Int. Cl.
*B23K 35/02* (2006.01)
*B23K 9/173* (2006.01)
(Continued)

(52) U.S. Cl.
CPC .......... *B23K 35/0266* (2013.01); *B23K 9/173* (2013.01); *B23K 35/383* (2013.01);
(Continued)

(58) Field of Classification Search
CPC ............ B23K 2101/34; B23K 2103/04; B23K 35/0266; B23K 35/383; B23K 35/0294; B23K 35/406; B23K 9/173
See application file for complete search history.

(56) References Cited

U.S. PATENT DOCUMENTS

| 1,161,366 A | 11/1915 | Wohlrab |
| 2,727,125 A | 12/1955 | Muller |

(Continued)

FOREIGN PATENT DOCUMENTS

| CN | 102091873 A | 6/2011 |
| CN | 105992668 A | 10/2016 |

(Continued)

OTHER PUBLICATIONS

Hisatomi, "Method for Brazing Aluminum Alloy Material and Method for manufacturing Brazed Structure," 2015 (Year: 2015).*

(Continued)

*Primary Examiner* — Brian W Jennison
*Assistant Examiner* — Abigail H Rhue

(57) ABSTRACT

A welding method using embodiments of electrodes (100) with coaxial power feed. The electrode comprises a metal cylinder (105) defining a hollow core (110). The hollow core provides a conduit for delivering core feed materials (150) therebetween via a delivery means (200). The cylinder may be formed of pure metals or extrudable alloys for forming a desired superalloy material composition; while the delivered core feed materials comprise a balance of compositional constituents for forming the desired superalloy material composition. The resulting deposit achieves the desired superalloy composition as a result of at least a combination of the cylinder materials and core feed materials. The electrode may further include a flux coating (120) surrounding the cylinder. The flux material may also contribute to the desired superalloy composition as a result of the weld operation.

7 Claims, 2 Drawing Sheets

1000

| 1010 | Melting a hollow cored electrode to form a deposit of a substrate material on a substrate; |
| 1020 | Delivering core feed materials for forming the deposit through a conduit defined by the hollow core while melting the electrode; |
| 1030 | Removing any slag resulting from the melting process and resulting from a shielding means, e.g., a flux coating from the substrate; and |
| 1040 | finishing the substrate and preparing it use in an industrial machine. |

(51) Int. Cl.
  *B23K 103/04* (2006.01)
  *B23K 101/34* (2006.01)
  *B23K 35/38* (2006.01)
  *B23K 35/40* (2006.01)
(52) U.S. Cl.
  CPC ........ *B23K 35/406* (2013.01); *B23K 2101/34* (2018.08); *B23K 2103/04* (2018.08)

(56) References Cited

U.S. PATENT DOCUMENTS

| | | | | |
|---|---|---|---|---|
| 2,819,383 | A * | 1/1958 | Johnston | B23K 35/0205 219/137 WM |
| 3,513,288 | A * | 5/1970 | Arnoldy | B23K 9/1336 219/137 R |
| 4,673,121 | A * | 6/1987 | Holmgren | B23K 35/406 228/148 |
| 4,683,368 | A * | 7/1987 | Das | B23K 35/0266 428/614 |
| 6,750,430 | B2 * | 6/2004 | Kelly | B21C 37/042 219/146.31 |
| 7,754,033 | B2 * | 7/2010 | Ishikawa | C21D 10/00 148/558 |
| 9,393,644 | B2 | 7/2016 | Bruck et al. | |
| 2010/0078411 | A1 * | 4/2010 | Hughes | B23K 26/147 219/121.63 |
| 2010/0116793 | A1 | 5/2010 | Gruger et al. | |
| 2015/0224599 | A1 | 8/2015 | Bruck et al. | |
| 2016/0144441 | A1 | 5/2016 | Bruck et al. | |
| 2016/0297034 | A1 | 10/2016 | Bruck et al. | |

FOREIGN PATENT DOCUMENTS

| | | | |
|---|---|---|---|
| JP | S6195772 A | 5/1986 | |
| RU | 2191665 C2 | 10/2002 | |
| RU | 2015136598 A | 3/2017 | |
| SU | 774875 A1 | 10/1980 | |
| WO | WO-2015029552 A1 * | 3/2015 | B23K 1/0012 |

OTHER PUBLICATIONS

PCT International Search Report and Written Opinion of International Searching Authority dated Oct. 24, 2017 corresponding to PCT International Application No. PCT/US2017/039471 filed Jun. 27, 2017.

* cited by examiner

METHODS AND APPARATUS OF WELDING USING ELECTRODES WITH COAXIAL POWDER FEED

TECHNICAL FIELD

The present disclosure relates generally to the field of materials technology, and more particularly to methods and apparatus of welding using electrodes with coaxial power feed.

BACKGROUND

Welding of superalloys presents a variety of technical challenges because of the high strength (and corresponding low ductility) that these alloys are optimized to achieve. One challenge involves the weld filler metal wires, which are typically fabricated to provide a specific/particular alloy deposit, i.e., a desired deposit composition for a specific superalloy, for routine processing via arc welding (e.g., GTAW, PAW, GMAW etc.) or for beam (e.g., laser) processing with wire (e.g., LBW). Such specificity limits any flexibility of trying to achieve a variety of compositions of superalloy deposits.

SUMMARY

It should be appreciated that the present inventor has recognized the above limitations of prior art weld filler metal wires and electrodes, and now discloses a new electrode for use in a weld operation.

In one embodiment, an electrode for use in a welding operation is provided. The electrode comprises a metal cylinder defining a hollow core therebetween. The hollow core provides a conduit for delivering one or more materials therebetween via a delivery means. The cylinder may be formed of pure metals or metal alloys for forming a desired superalloy material composition, while materials delivered via the conduit comprises a balance of composition constituents for forming the desired superalloy material composition. The resulting deposit achieves the desired superalloy composition as a result of at least the combination of the cylinder materials and core delivered materials. It should be appreciated that the pure metal or metal alloy of the cylinder be of a material that is readily extruded (e.g., plastically shaped) into its cylindrical form. The electrode may further comprise a flux material surrounding the cylinder and/or a flux material delivered, e.g., via the conduit. The flux material may also contribute to the desired superalloy composition as a result of the weld operation. The delivery means may be a carrier assist gas or a mechanical assembly operably connected to the electrode for delivering the one or more materials to a delivery end of the electrode.

DETAILED DESCRIPTION

The present inventor has developed a novel method and apparatus for depositing a variety of difficult to deposit alloys. The method involves a variation of a shielded metal arc welding (SMAW) process, which is also referred to as stick welding or coated electrode welding. The novel process involves the use of an electrode consisting of a hollow metal or metal alloy sheath/core which may be surrounded by a shielding means, e.g., an adherent coating flux. In operation, the metal alloy of the hollow sheath/core conducts welding current while the flux coating provides shielding. During the welding operation, the hollow metal sheath/core melts off and provides, e.g., the base material for the deposit, e.g., a pure nickel or alloyed nickle, iron etc., while the filler material delivered via the hollow core provides, e.g., the remaining materials required for forming the desired deposit. The flux coating melts during the weld operation, releases shielding gases, and provides a slag (first molten and then solid) to protect the molten deposit from atmospheric reactions. It should be appreciated that the flux may also contribute to the deposit's chemistry and may act to remove impurities from the molten pool.

It should be appreciated that the inventor's novel electrode now provides the flexibility for forming a variety of deposit superalloy compositions from a single electrode. For example, for a nickel based superalloy, an electrode comprising a pure nickel metal cylinder can be used to form any nickel based deposit superalloy composition, as the remaining or balance compositional constituents for forming the desired deposit composition may now be delivered via the hollow core of the electrode. Said another way, it is now possible to form, e.g., multiple types of nickel deposits, by changing the materials delivered through the electrode hollow core to form the desired deposit instead of changing the electrode. Embodiments of the electrode may include and be applied to other materials, in addition to the superalloys referenced herein, e.g., stainless steels, oxide dispersion strengthened alloys, etc., where the metal cylinder would be formed of the, e.g., iron, while the remaining constituents for forming stainless steel deposits are provided via the hollow core.

Figure 1:
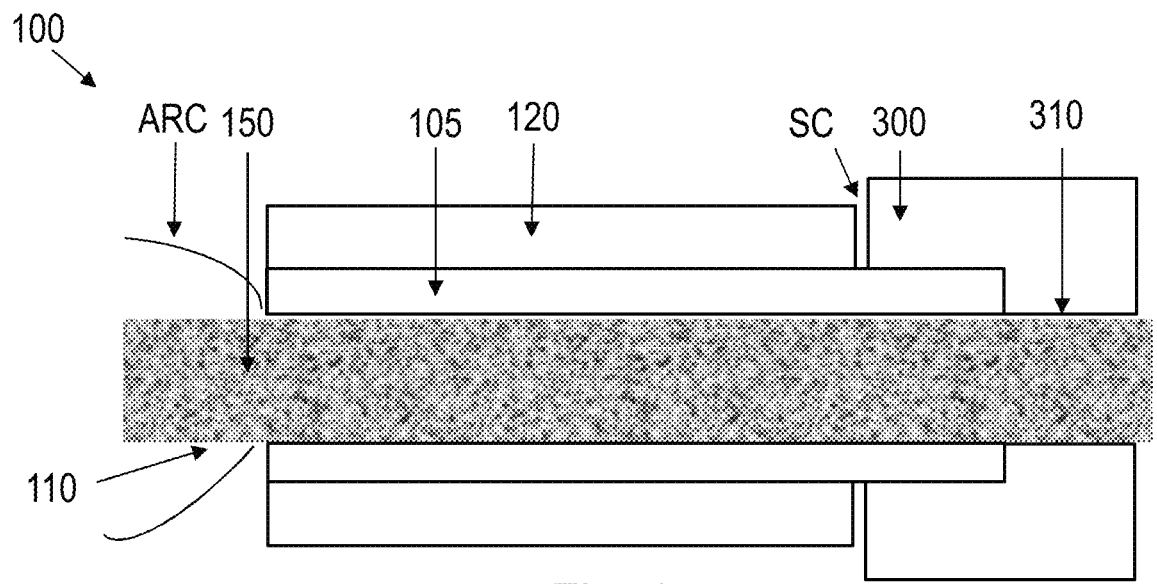
FIG. 1 is a schematic illustration of an embodiment of an electrode in accordance with the disclosure provided herein.

Referring now to the drawings wherein the showings are for purposes of illustrating embodiments of the subject matter herein only and not for limiting the same, FIG. 1 is a schematic illustration of one exemplary embodiment of a welding apparatus, i.e., electrode 100.

The electrode 100 may be an SMAW electrode 100 and may include a cylinder 105, e.g., a metal cylinder or tube, defining a hollow core 110 therebetween for establishing an electrical current during a weld operation. The core 110 may be cylindrically shaped defining an interior (i.e., a core interior) adapted or sized to provide a conduit for delivery of materials 150, e.g., a stream of powdered feed materials (e.g., metal alloy powder and/or other constituents) and a material delivery means, e.g., a carrier (assist) gas or rotary system, therebetween.

The cylinder 105 may be formed of a ductile material, such as elemental metals, e.g., iron, nickel, cobalt, aluminum, or extrudable metal alloy materials including a subset of elements of a composition contributing to define a desired, e.g., superalloy, material, e.g., nickel or nickel alloy (e.g., CM247, Inconel 718, Inconel 939, Haynes 282, ER NiCr-3 . . . ). In operation, the conduit 110, i.e., the hollow cored portion of the electrode 100, may facilitate the delivery of a balance of the compositional constituents, e.g., Cr, Mo, Ti, Al, W, Mo, C, Ta, etc., in a powder form and with the carrier gas. It should be appreciated that the combination of the cylinder material and the core delivered materials results, after possible anticipated volatile losses, in achieving the deposited superalloy composition.

The carrier (assist) gas may be any known type of arc welding assist gas, e.g., argon, helium, hydrogen, carbon dioxide, oxygen, nitrogen, etc. or blends thereof, and may be optionally required depending upon what embodiment of the electrode 100 is provided. The feed rate of powder with assist gas may be regulated in concert with, e.g., the burn-off rate of the electrode 100 to achieve the desired superalloy deposit composition. The inventor has identified increased and potentially unlimited flexibility in this approach to lean or enrich the core powder feed rate or to regulate core powder composition to modulate deposit composition.

With continued reference to the figures, the electrode 100 may further include a shielding means 120 to provide shielding from, e.g., atmospheric reactions when an arc is established between the end of the electrode and substrate to be welded. In one embodiment, the shielding means may be an adherent flux coating 120 which may surround the metal alloy cored portion 110 of the electrode 100. The flux coating 120 may provide shielding, e.g., during the SMAW operation and protection from, e.g., atmospheric reactions when an arc is established between the end of the electrode and substrate to be welded.

The flux coating 120 may be a full flux coating such that it is capable of providing complete shielding, e.g., during the SMAW operation shielding, without any further assistance, e.g., from another shielding source. Additionally or alternatively, the flux coating 120 may be a reduced flux coating, which may require an additional shielding means to assist with the shielding function. Additionally or alternatively, the shielding means may be flux material projected or delivered through the conduit 110. The conduit delivered flux may be provide along with any hollow core feed materials, e.g., either mixed therewith and simultaneously fed or as conglomerate particles.

In yet a further exemplary embodiment, the shielding means 120 may be an assist gas which may be fed around or through the conduit 110 to provide shielding or additional shielding, e.g., at the point of welding. The additional shielding means may be provided with any of the flux coatings (full or reduced), or in lieu of the flux coating 120. Additionally or alternatively, an auxiliary shielding gas may also be provided, e.g., at the point of welding, to provide additional shielding, e.g., at an outer surface of the metal alloy tubular core wire 100. In yet a further embodiment, additional powdered flux may also be projected or delivered through the conduit 110 to assist in shielding as the additional shielding means.

Figure 2:
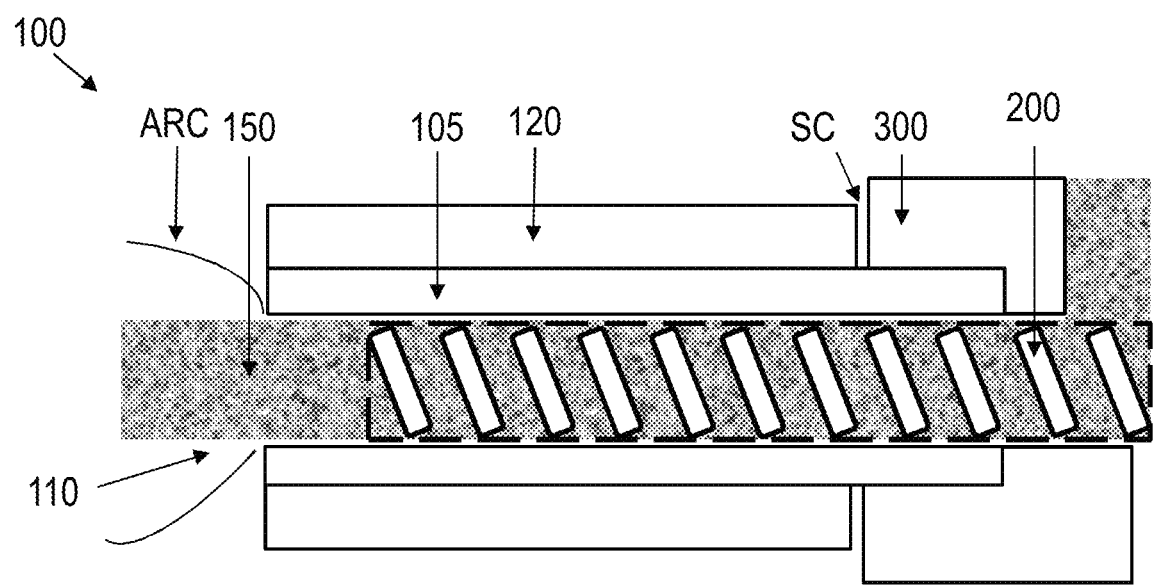
FIG. 2 is a schematic illustration of a further embodiment of the electrode of FIG. 1, and in accordance with the disclosure provided herein.

With continued reference to the figures, and now FIG. 2, a further embodiment of the electrode 100 is provided. In the embodiment of FIG. 2, the delivery means for delivering materials through the hollow core 110 may be a mechanical assembly 200 to mechanically deliver the feed materials (e.g., powder) through the conduit 110. In one embodiment, the mechanical assembly 200 may be a rotary screw or auger 200 (FIG. 2) which may be operationally configured to control the flow and/or throughput of materials through the core 110.

The auger 200 may be configured to retract or be withdrawn axially relative to the electrode 100 and at a burn-off rate of the electrode 100. Additionally or alternatively, the electrode 100 may move or be projected over, e.g. a fixed auger during the weld operation.

Delivery of the feed materials (e.g., powder) via the auger 200 may be determined by the speed of rotation of the auger 200, and size (depth) and interval of auger threading (flutings). Additionally or alternatively, the auger delivery end, i.e., the end where the powder is being delivered via the auger 200, should be at or reside in the proximity of the welding end of the electrode 100 (e.g., ARC of FIG. 2).

In yet another exemplary embodiment, the delivery means may be one or more acoustic or ultrasonic waves projected from an acoustic or ultrasonic device or system. The ultrasonic system may be configured, e.g., to generate and/or impose ultrasonic waves to the electrode 100 to enhance delivery of the materials through the conduit 110. The waves may be directed towards the electrode 100 or towards the materials within the conduit 110 for directionally controlling the flow and throughput of materials within the conduit 110 and through the electrode 100.

It should be appreciated that the mechanical delivery means may be used with the carrier assist gas or in lieu of any gas assisted propulsion of core feed materials through the electrode 100. Any combination of delivery means may be used for delivering the core feed materials via the conduit 110.

Figure 3:
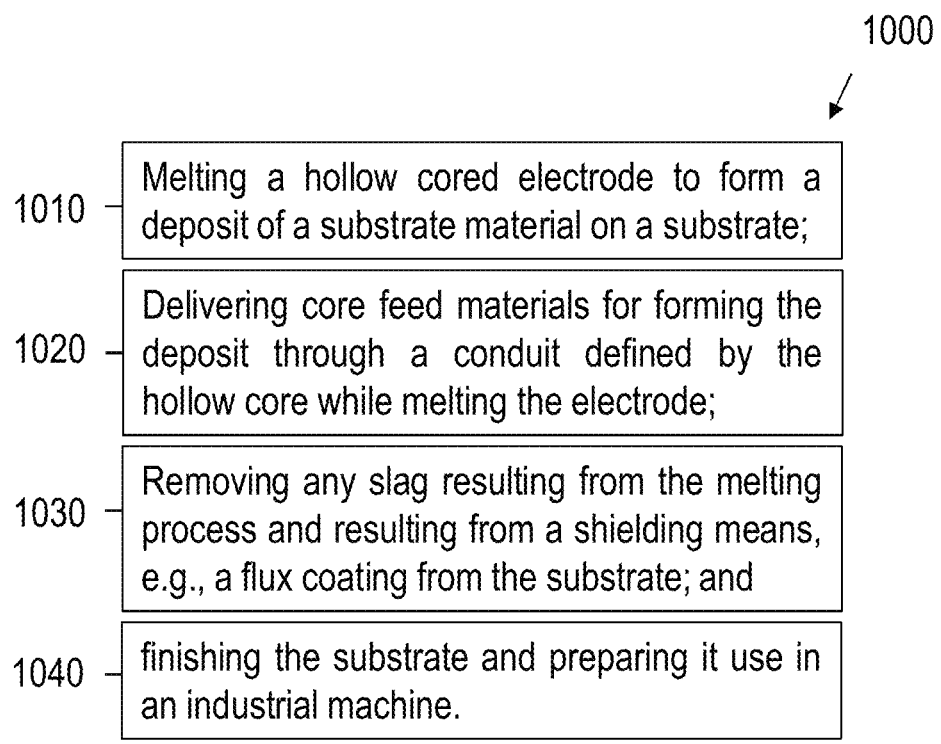
FIG. 3 illustrates a block diagram of a welding method in accordance with the disclosure provided herein.

With continued reference to the figures, and now FIG. 3, a welding technique (method) 1000 utilizing embodiments of the electrode 100 is provided. It should be appreciated that any steps disclosed herein are not required to be performed in any particular order, and are hereby provided for exemplary purposes. For example, steps for delivering the materials via the hollow core 110 may occur prior to forming the weld pool, while forming the weld pool, or once the weld pool has been formed.

The method 1000 may include melting the electrode 100 to form a deposit of, e.g., a material composition, e.g., a superalloy material composition on a superalloy substrate (1010). It should be appreciated that during the weld process, the electrode 100 may be handled, e.g., via an electrode holder 300, also known as a stinger 300. In an exemplary embodiment, the stinger 300 may define an interior or opening having at least a portion thereof sized or adapted to facilitate the feeding of materials 150 and/or the delivery means 200 (e.g., propulsion gas, auger) therethrough. For example, FIG. 2 shows an embodiment of the stinger 300 with an interior 310 adapted to receive the auger 200 therethrough for delivery of the feed materials 150 at the delivery end of the electrode 100 near the point of welding.

The electrode 100 may be held by the stinger 300 opposite the delivery end of the feed materials 150, i.e., opposite the welding end. Portions of any electrode coatings, e.g., flux coating 200, may also be removed or stripped (SC, FIG. 1) in order for the stinger 300 to hold the electrode 100 (e.g., the metal cylinder 105) and to thereby establish a welding current connection during the welding operation.

During the welding process the electrode 100 may be consumed at the point of welding, i.e. it may be melted and becomes part of a weld pool, as does the flux coating 120 in embodiments of the electrode 100 including the flux coating 120. To form the weld pool, e.g., the substrate may be melted, e.g., via an electric arc, laser beam, or other high energy source used in welding techniques.

The metal cylinder 105 may comprise pure metals for forming, e.g., the desired superalloy material deposit composition. The core feed materials 150 comprising a balance of compositional constituents for forming the desired superalloy material deposit may be delivered through the conduit 110, e.g., via the delivery means, at a delivery end of the electrode proximate to or at the point of welding (1020). Upon consumption of the metal cylinder, the core delivered materials, and optionally the flux coating, the combination of the melted cylinder 105 and delivered materials 150 may result in the deposit achieving the desired superalloy material composition.

It should be appreciated that in operation, the flux coating 120 upon consumption generates a shielding gas that shields the weld pool and surrounding heated area and protects the substrate from atmospheric contamination. The flux also enters the weld pool and forms a slag on the surface of the weld pool which may remain on a weld bead when the weld pool solidifies into a weld bead. While present in the volume of the weld pool, it should be appreciated that the flux may also deoxidize and/or remove impurities present in the weld pool. While present on the surface, the slag may also help shape the weld pool during solidification. The flux coating 120 may be neutral, i.e., may have virtually no effect on deposit composition, or alternatively, the flux may be active, i.e., making additions to the deposit composition or compensating for volatile losses during processing, e.g., the weld operation.

Additionally or alternatively, the method 1000 may include removing any slag resulting from melting of the flux coating 120 via any means for removing slag from a surface of a substrate known in the art and chosen with sound judgment (1030).

After slag removal, if needed, the method 1000 may include steps for finishing the substrate or component and preparing the component to be used in operation (1040). In this step 1040, and upon removal of any slag, the finishing and preparation steps may include heat treating the component, e.g., via a furnace, e.g., a high heat vacuum furnace. Additionally or alternatively, and prior to or after heat treatment, the component may be finished or machined to reduce undesired structures from the surface of the substrate, e.g., via a chip-removing method (e.g., using abrasive blasting media), and/or a grinding method. Additionally or alternatively, the finishing steps may include non-destructive testing methods to test the integrity of the component.

It should be appreciated that any embodiment of the electrode 100 described herein and methods of using the same may be applied to welding processes which utilize electrodes, e.g., cored wire gas metal arc welding (GMAW) (metal cored, flux cored (FCAW) or metal and flux cored. While these processes utilize coiled wires with fixed core materials prefabricated in the wire, embodiments of the electrode 100 may be coiled, i.e., formed in a coiled shape, comprising a metal sheath/core defining a hollow interior therebetween. In this embodiment, and because the electrode 100 comprises a coiled shape, the core feed materials may be delivered to the delivery end of the electrode 100 via any of the delivery means 200 disclosed herein, including via carrier assist/propulsion gas, and also a flexible auger, e.g., fluted polyurethane line, which may rotate to deliver the fed materials near the point of processing.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof.

It should be noted that the term "comprising" does not exclude other elements or steps and the use of articles "a" or "an" does not exclude a plurality.

I claim:

1. An electrode comprising:
a metal cylinder defining a weld end and a hollow interior;
powdered feed materials positioned in the hollow interior and movable with respect to the metal cylinder towards the weld end of the electrode; and
a delivery assembly co-axially disposed inside the axially extending metal cylinder and operable to move the powdered feed materials co-axial with respect to the axially extending metal cylinder,
wherein the material comprises extrudable metal alloy materials including a subset of elements of a composition contributing to define a desired superalloy material composition, and wherein the powdered feed materials delivered via the conduit comprises a balance of compositional constituents defining the desired superalloy material composition,
wherein the delivery assembly comprises a mechanical assembly that includes an auger, and
wherein the auger is configured to retract axially relative to the electrode at a burn-off rate of the electrode and co-axial with respect to the delivery assembly.

2. The electrode of claim 1, wherein the material comprises one or more of iron, nickel, cobalt, aluminum, titanium.

3. The electrode of claim 1 further comprising:
a flux coating surrounding the metal cylinder.

4. An electrode comprising:
a sheath surrounding a hollow core adapted to deliver metal alloy materials therethrough via a delivery means operably connected to the core, wherein the sheath comprises a pure metal or metal alloy composition for forming a deposit of a desired superalloy material composition, and wherein the metal alloy materials delivered via the hollow core comprise a balance of compositional constituents defining the desired superalloy material composition, wherein the delivery means is operable to move the metal alloy materials in the hollow core co-axially relative to the sheath,
wherein the delivery means is a propulsion gas selected from one or more of argon, helium, hydrogen, carbon dioxide, oxygen, nitrogen, or blends thereof, and
wherein the feed rate of the metal alloy materials with the propulsion gas is regulated to a burn-off rate of the electrode.

5. The electrode of claim 4 further comprising:
a flux coating surrounding the sheath.

6. The electrode of claim 4, wherein the pure metal is selected from one of iron, nickel, cobalt, aluminum, titanium.

7. The electrode of claim 4, wherein the electrode is handled via a stinger at an end opposite a delivery end of the electrode, and wherein the stinger comprises an interior portion sized to correspond with the hollow interior or core for facilitating delivery of the materials via the hollow interior or core.

* * * * *